United States Patent
Hanson et al.

(10) Patent No.: US 11,415,436 B2
(45) Date of Patent: Aug. 16, 2022

(54) PARAMETRIC DISTURBANCE SENSOR FOR A VEHICULAR MEASUREMENT SYSTEM

(71) Applicant: INTERNATIONAL ROAD DYNAMICS, INC., Saskatoon (CA)

(72) Inventors: Randy Hanson, Saskatoon (CA); Tyler Haichert, Saskatoon (CA); Martin Russell Conrad Plemel, Saskatoon (CA)

(73) Assignee: INTERNATIONAL ROAD DYNAMICS, INC., Saskatoon (CA)

( * ) Notice: Subject to any disclaimer, the term of this patent is extended or adjusted under 35 U.S.C. 154(b) by 567 days.

(21) Appl. No.: 16/341,268

(22) PCT Filed: Oct. 11, 2017

(86) PCT No.: PCT/CA2017/051209
§ 371 (c)(1),
(2) Date: Apr. 11, 2019

(87) PCT Pub. No.: WO2018/068138
PCT Pub. Date: Apr. 19, 2018

(65) Prior Publication Data
US 2021/0116268 A1    Apr. 22, 2021

Related U.S. Application Data

(60) Provisional application No. 62/406,905, filed on Oct. 11, 2016.

(51) Int. Cl.
*G01D 11/24*    (2006.01)
*E01F 11/00*    (2006.01)
(Continued)

(52) U.S. Cl.
CPC ............. *G01D 11/24* (2013.01); *E01F 11/00* (2013.01); *G01G 9/00* (2013.01); *G01G 19/035* (2013.01)

(58) Field of Classification Search
CPC ........... G01D 11/24; E01F 11/00; G01G 9/00; G01G 19/035
See application file for complete search history.

(56) References Cited

U.S. PATENT DOCUMENTS

| 3,925,740 A | 12/1975 | Dennis |
| 4,799,381 A | 1/1989 | Tromp |

(Continued)

FOREIGN PATENT DOCUMENTS

| GB | 2250813 | 6/1992 |
| WO | 2014/136055 | 9/2014 |

OTHER PUBLICATIONS

International Search Report and Written Opinion corresponding to International Patent Application No. PCT/CA2017/051209, dated Jan. 9, 2018.

(Continued)

*Primary Examiner* — Jamel E Williams
(74) *Attorney, Agent, or Firm* — Nixon & Vanderhye, P.C.

(57) ABSTRACT

A Parametric Disturbance Sensor is provided. The parametric disturbance sensor has a stripline enclosure having an internal chamber; a stripline sensor core positioned within the internal chamber; a fill material filling the internal chamber so that the stripline sensor is not in direct contact with the stripline sensor core enclosure; and a cable-end connector connected to the stripline sensor core for connecting the stripline sensor core to a processing unit.

24 Claims, 10 Drawing Sheets

(51) Int. Cl.
*G01G 9/00* (2006.01)
*G01G 19/03* (2006.01)

(56) References Cited

U.S. PATENT DOCUMENTS

| | | | |
|---|---|---|---|
| 5,257,630 A | 11/1993 | Broitman et al. | |
| 5,693,886 A * | 12/1997 | Seimiya | G01L 1/142 |
| | | | 73/718 |
| 5,998,741 A * | 12/1999 | Beshears | G08G 1/015 |
| | | | 177/133 |
| 6,311,561 B1 * | 11/2001 | Bang | G01L 9/0073 |
| | | | 73/708 |
| 6,894,233 B2 * | 5/2005 | Dingwall | G07B 15/00 |
| | | | 177/210 C |
| 7,153,383 B2 | 12/2006 | Gebert | |
| 9,429,463 B2 * | 8/2016 | Hanson | G01L 1/06 |
| 10,859,430 B2 * | 12/2020 | Hanson | G01G 19/024 |
| 2011/0267200 A1 * | 11/2011 | Reynolds | G01G 23/3742 |
| | | | 340/666 |
| 2014/0249711 A1 * | 9/2014 | Hanson | G01L 1/14 |
| | | | 701/29.1 |
| 2016/0018252 A1 | 1/2016 | Hanson et al. | |

OTHER PUBLICATIONS

Supplemental European Search Report for Appln No. EP 17860733.9 dated May 14, 2020.
Chinese Office Action with translation for CN 201780062448.8 dated Mar. 31, 2021.

\* cited by examiner

PARAMETRIC DISTURBANCE SENSOR FOR A VEHICULAR MEASUREMENT SYSTEM

RELATED APPLICATIONS/INCORPORATION BY REFERENCE

The present application is a national phase application of International Patent Application No. PCT/CA2017/051209, filed on Oct. 11, 2017, and entitled "Parametric Disturbance Sensor for a Vehicular Measurement System," which claims the benefit of U.S. Provisional Patent Application No. 62/406,905, filed on Oct. 11, 2016, and entitled "Parametric Disturbance Sensor for a Vehicular Measurement System." The above-identified applications are hereby incorporated herein by reference in their entirety.

BACKGROUND

Intelligent transportation systems may involve data collection, toll collection, vehicle classification, weigh in motion (WIM), and other traffic monitoring or traffic management systems.

For example, WIM systems are used to detect and weigh vehicles in motion in order to enhance the operation of road systems in a safer and more efficient manner.

A WIM system uses one or more sensors to obtain information about a vehicle as it is sensed by the sensor, typically as the vehicle moves over the sensor. Some information may be measured directly from a sensor, and other information may be measured and derived from a combination of sensors operating together.

Generally, time domain reflectometry (TDR) is a measurement technique based on the principle that a transmission line of a particular geometry presents a known characteristic impedance. Therefore, changes to the geometry of the transmission line result in changes in the characteristic impedance that can be measured using TDR techniques. A skilled person would understand that time domain reflectometry may be used with optical or electrical signals, and that practically the optical and electrical signals are physically different requiring differently skilled knowledge and equipment to measure changes in transmission line characteristics.

In an electrical transmission line, a reflection will be generated whenever an incident wave meets a change in the characteristic impedance, which is also known as a discontinuity. TDR measurement techniques can then be used to determine the location and magnitude of the discontinuity in the transmission line from the reflected wave. Thus, the time the reflected wave takes to travel back along the transmission line can be translated into a distance along the transmission line. The magnitude of the voltage of the reflected wave can be used to calculate the amount of change in the characteristic impedance.

TDR measurement techniques may use a step input voltage for the incident wave shape as it eases the complexity of interpreting the reflected signals. In source- or both-ends terminated transmission lines, the step input voltage is divided between the source impedance and the transmission line impedance. If the source and transmission line impedances are matched, then the voltage measured between the source and the transmission line over the round-trip of the incident wave along the transmission line is half of the step input voltage. Where discontinuities exist on the transmission line, the voltage measured will deviate from exactly half due to the received reflections. Other approaches for TDR measurement may also be used, such as wave modulation with a swept frequency.

UK patent application GB 2,250,813A discloses a weighing apparatus for vehicles. The apparatus comprises a fibre optic cable whose light transmission characteristics vary under load and is encased in a pressure pad of resilient material and laid across a roadway. As a vehicle crosses the pressure pad, a time domain reflectometer calculates the load exerted by each wheel by monitoring the intensity of back scattered light from the fibre optic cable.

SUMMARY

A parametric disturbance sensor is provided. The parametric disturbance sensor uses Electrical Time Domain Reflectometry measurement techniques. The parametric disturbance sensor is configured to be used in a weigh in motion (WIM) system and VEHICLE INFORMATION IN MOTION system.

Vehicle information that may be measured includes, for example, the number of axles, weight per axle, weight per wheel, wheel width, vehicle weight, wheel count, wheel spacing, axle spacing, inter-axle spacing, axle width, and axle and/or vehicle speed. Aggregate information may also be collected such as the total number of vehicles detected by the sensors.

In an aspect, the parametric disturbance sensor is resistant to environmental contaminants such as moisture, dirt, or road debris. The parametric disturbance sensor uses few moving parts and is resistant to mechanical damage. The baseline impedance of the parametric disturbance sensor may be tuned simply and in a variety of ways during the manufacturing process. The parametric disturbance sensor is straightforward to manufacture.

In another aspect, the sensor core comprises, a center trace, a first ground plane separated from the center trace by a first separator, a second ground plane separated from the center trace by a second separator, and, a cable-end connector connected to the center trace for connecting the sensor core to a processing unit. In various embodiments, the separators are elastically deformable, electrically insulating foam, and/or a closed cell foam with a loss tangent similar to air.

What is provided is a Parametric Disturbance Sensor. The parametric disturbance sensor has a stripline enclosure that defines an internal chamber. A stripline sensor core is positioned within the internal chamber. A fill material is used to fill the internal chamber. Furthermore, a cable-end connector is connected to the stripline sensor core for connecting the stripline sensor core to a processing unit.

A method for manufacturing a parametric disturbance sensor is provided. The method includes positioning a stripline sensor core within an internal chamber of a stripline enclosure. A first end of the internal chamber is then sealed. A fill material is used to fill the internal chamber.

A sensor core is also provided. The sensor core includes a center trace. A first ground plane is separated from the center trace by a first separator, and a second ground plane separated from the center trace by a second separator. A cable-end connector is connected to the center trace for connecting the sensor core to a processing unit.

Other aspects are identified in the claims.

Other aspects and features of the non-limiting embodiments may now become apparent to those skilled in the art

Figure 1:
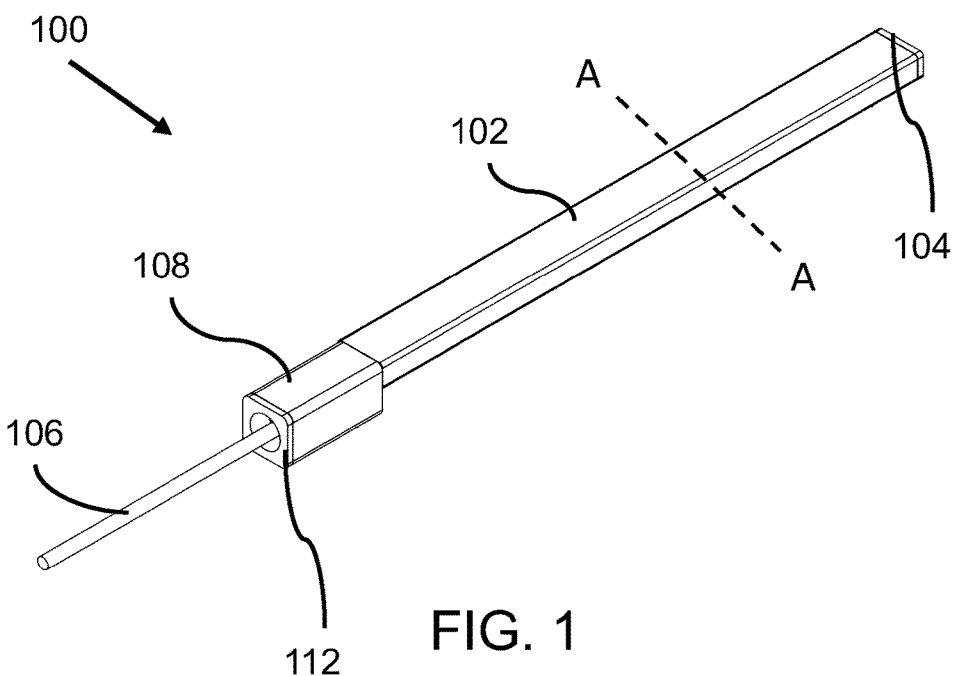
FIG. 1 [PAGE 1/10] depicts a perspective view of an example parametric disturbance sensor.

The drawings are not necessarily to scale and may be illustrated by phantom lines, diagrammatic representations and fragmentary views. In certain instances, details unnecessary for an understanding of the embodiments (and/or details that render other details difficult to perceive) may have been omitted.

Corresponding reference characters indicate corresponding components throughout the several figures of the drawings. Elements in the several figures are illustrated for simplicity and clarity and have not been drawn to scale. The dimensions of some of the elements in the figures may be emphasized relative to other elements for facilitating an understanding of the various disclosed embodiments. In addition, common, but well-understood, elements that are useful or necessary in commercially feasible embodiments are often not depicted to provide a less obstructed view of the embodiments of the present disclosure.

LISTING OF REFERENCE NUMERALS USED IN THE DRAWINGS

100—Parametric Disturbance Sensor
102—Stripline Enclosure
104—End Cap
106—Cable
108—Cable End Enclosure
110—internal chamber
112—Cable End Enclosure cap
200—Stripline Sensor Core
202—Cable End Connector
400—Vertical Positioning Blocks
402—Horizontal Positioning Blocks
404—Positioning Blocks
406—Inner wall of the internal chamber
600—Fill material
700—Sensor Core Stiffener
702—Far End Connection
800—First Ground Plane
802—First Ground Plane PCB
804—Separators/Foam
806—Center Trace
808—Second Ground Plane
810—Second Ground Plane PCB
811—First Ground Plane Cable End PCB
812—Second Ground Plane Cable End PCB
900—Wheel
902—Axle
904—Road
906—Force
908—Contact patch/area below contact patch
1000—Adhesive/Adhesive Layer
1002—Air Gap

DETAILED DESCRIPTION OF THE NON-LIMITING EMBODIMENTS

The following detailed description is merely exemplary and is not intended to limit the described embodiments or the application and uses of the described embodiments. As used, the word "exemplary" or "illustrative" means "serving as an example, instance, or illustration." Any implementation described as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure. The scope of the invention is defined by the claims. For the description, the terms "upper," "lower," "left," "rear," "right," "front," "vertical," "horizontal," and derivatives thereof shall relate to the examples as oriented in the drawings. There is no intention to be bound by any expressed or implied theory in the preceding Technical Field, Background, Summary or the following detailed description. It is also to be understood that the devices and processes illustrated in the attached drawings, and described in the following specification, are exemplary embodiments (examples), aspects and/or concepts defined in the appended claims. Hence, dimensions and other physical characteristics relating to the embodiments disclosed are not to be considered as limiting, unless the claims expressly state otherwise. It is understood that the phrase "at least one" is equivalent to "a". The aspects (examples, alterations, modifications, options, variations, embodiments and any equivalent thereof) are described regarding the drawings. It should be understood that the invention is limited to the subject matter provided by the claims, and that the invention is not limited to the particular aspects depicted and described.

Figure 2:
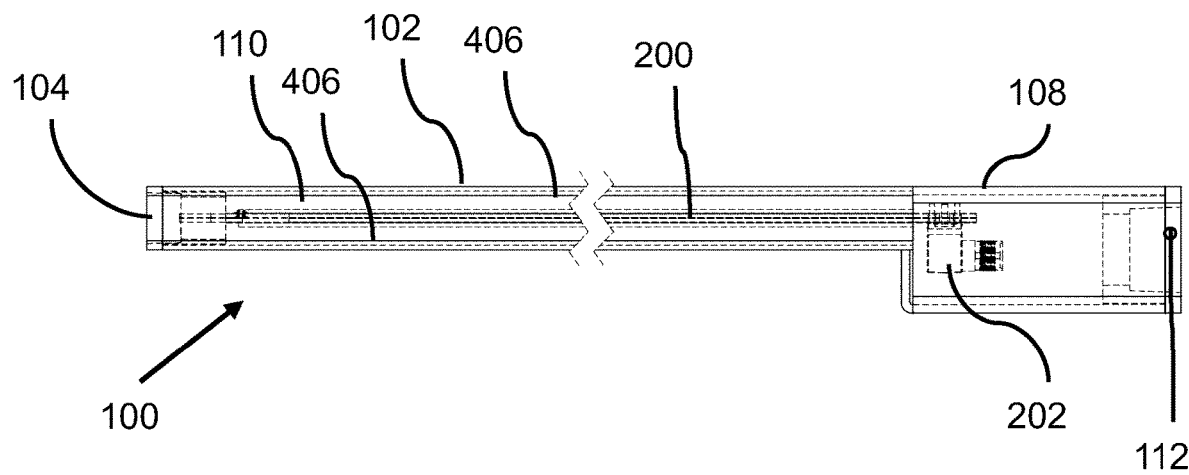
FIG. 2 [PAGE 1/10] depicts a cross-sectional view of the parametric disturbance sensor of FIG. 1

FIG. 1 depicts a perspective view of an example embodiment parametric disturbance sensor. FIG. 2 depicts a cross-sectional view of the parametric disturbance sensor of FIG. 1.

In accordance with an embodiment, the parametric disturbance sensor 100 includes a stripline enclosure (102) having an internal chamber (110), a stripline sensor core (200) positioned within the internal chamber, a fill material (600) filling the internal chamber (110), and a cable-end connector (202) connected to the stripline sensor core (200) for connecting the stripline sensor core (200) to a processing unit (not shown). In another embodiment, the fill material (600) fills the internal chamber (110) such that the stripline sensor core (200) is not in direct contact with the stripline enclosure (102).

Figure 3:
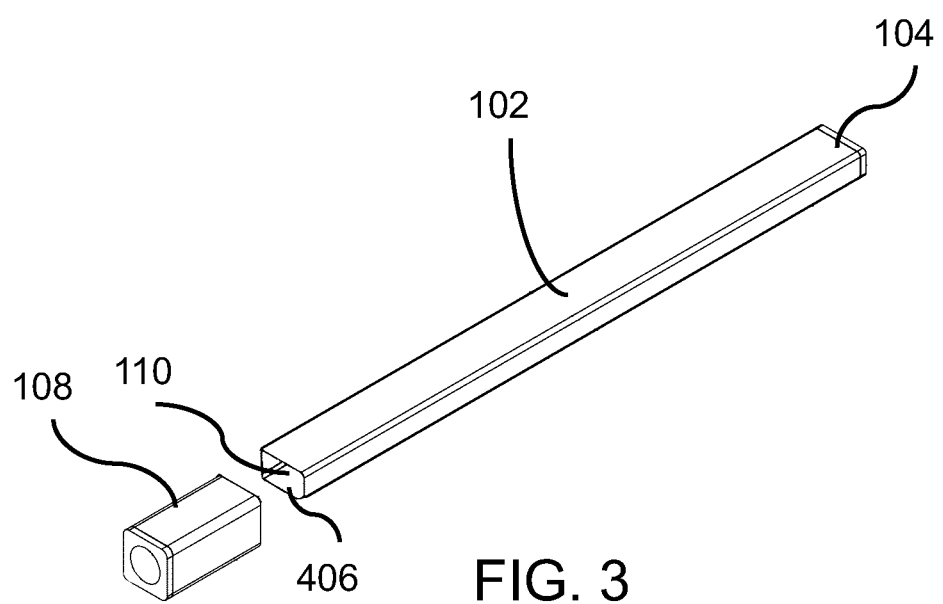
FIG. 3 [PAGE 2/10] depicts a perspective view of a stripline enclosure of an example parametric disturbance sensor.

FIG. 3 depicts a perspective view of a stripline enclosure of an example embodiment parametric disturbance sensor.

In accordance with an embodiment, the stripline enclosure 102 has an internal chamber 110. The stripline enclosure 102 encloses and protects, at least in part, a stripline sensor core 200. The stripline enclosure 102 also distributes, at least in part, a force exerted on the parametric disturbance sensor 100. For example, once a force is exerted on the stripline enclosure 102 the force is distributed, at least in part, over the stripline enclosure 102 on which the force is exerted. Examples of this force distribution include, but is not limited to, an elastic deformation or an elastic compression of the stripline enclosure 102.

The stripline enclosure 102 should be sufficiently resilient for use in a traffic monitoring system. In an example embodiment the stripline enclosure 102 is made of a steel tube (SAE 4130 chromium-molybdenum, SAE 304 stainless steel, or any other grade of steel suitable for such an application). A skilled person would understand that other materials could be used without departing from the scope of this disclosure. For instance, it may be appropriate to use different steel alloys depending on the environmental conditions. An example would be to use a more corrosion-resistant steel alloy for the stripline enclosure 102 when deploying the sensor in high salt and moisture environments (such as northern Canada and the US).

In some embodiments the parametric disturbance sensor 100 may also be enclosed in a protective layer (not shown) prior to being embedded in a roadway. This protective layer adds an additional layer of protection from the environment. Examples of protective layers include, but are not limited to, urethane, plastic, epoxy, tar, or any other material suitable for a protective layer.

It should be noted that the dimensions of the stripline enclosure 102 may affect the sensitivity of the parametric disturbance sensor 100. In accordance with an embodiment, the materials, width, and thickness of the sensor enclosure 102 may also be used to adjust the sensitivity of the parametric disturbance sensor 100. For instance, in this example the ability of the stripline enclosure 102 to deflect depends, at least in part, on physical characteristics of the stripline enclosure 102 such as wall thickness or width. By adjusting the wall thickness and/or width of the stripline enclosure 102 the deflection characteristics of the parametric disturbance sensor 100 can be modified. This will alter the sensitivity of the parametric disturbance sensor 100 when compared with another parametric disturbance sensor 100 using a stripline enclosure 102 having a different wall thickness.

Referring again to FIG. 1, FIG. 2, and FIG. 3, in accordance with an embodiment the parametric disturbance sensor 100 may also have a cable end enclosure 108. The cable end enclosure 108 is connected to an end of the stripline enclosure 102 and is used to enclose, at least in part, the cable end connector 202.

In some example embodiments the cable end enclosure 108 may be attached, at least in part, to the stripline enclosure 102. For example, the cable end enclosure 108 may be affixed to the stripline enclosure 102 via a weld, a solder, an adhesive, or a mechanical attachment means such as screws, rivets, folds, crimps, or clips. A skilled person would understand that other ways of attaching the cable end enclosure 108 to the stripline enclosure 102 may be contemplated without straying from the scope of this disclosure. For instance, the cable end enclosure 108 might be riveted to the sensor enclosure 102.

In another example embodiment the cable end enclosure 108 and the stripline enclosure 102 may be constructed as a single unit. For example, the stripline enclosure 102 could be constructed so as to leave sufficient room to enclose, at least in part, the cable end enclosure 108.

Figure 4A:
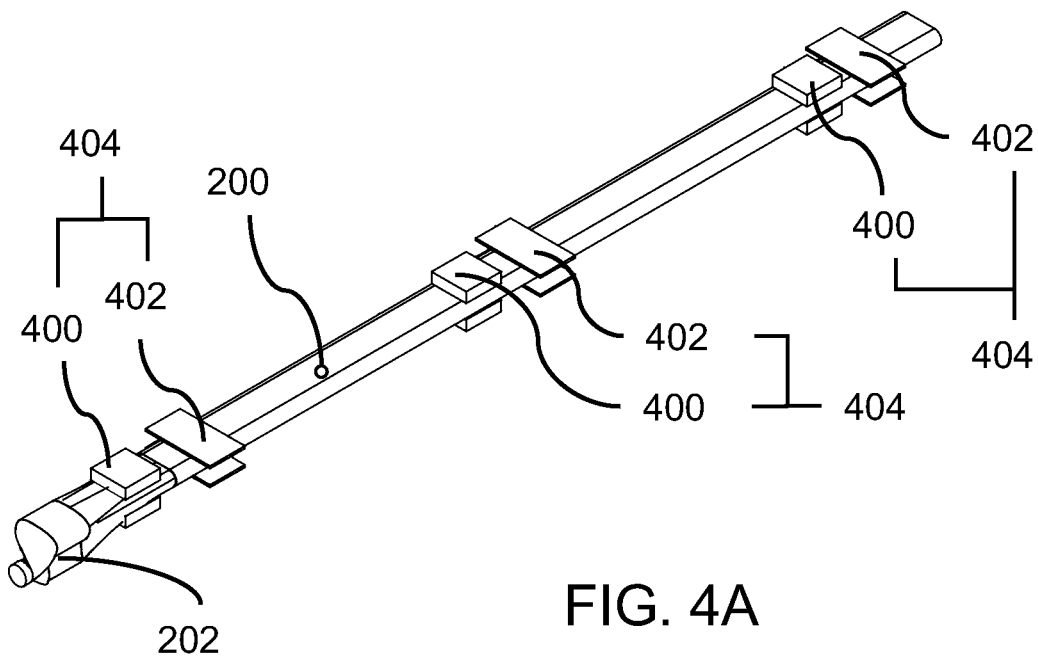
FIG. 4A [PAGE 3/10] depicts a perspective view of a stripline sensor core and positioning blocks of an example parametric disturbance sensor.
Figure 4B:
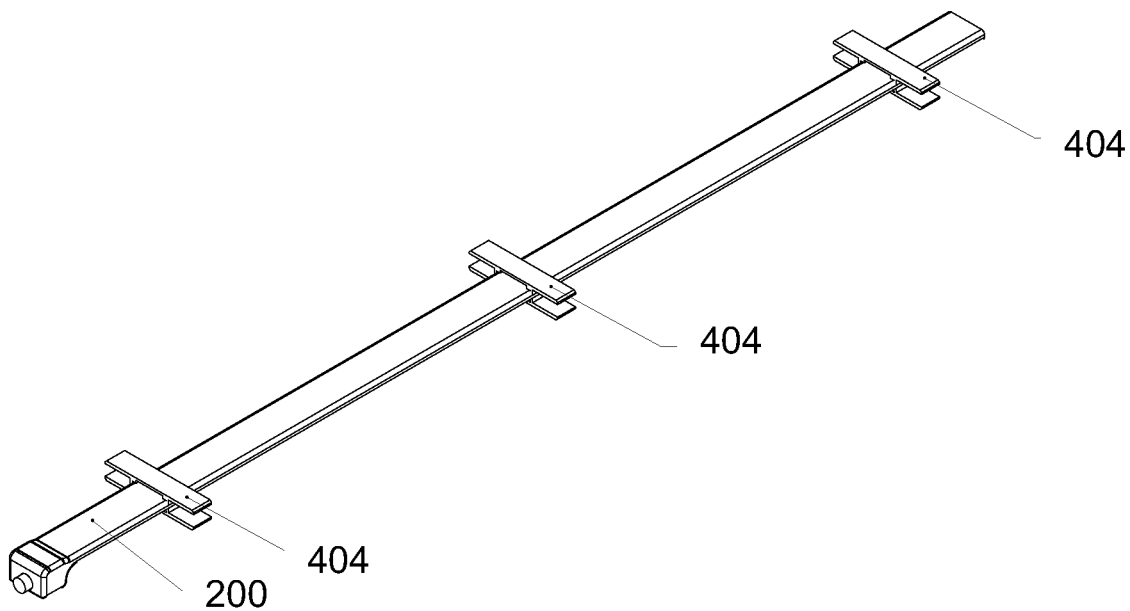
FIG. 4B [PAGE 3/10] depicts a perspective view of a stripline sensor core and positioning blocks of another example parametric disturbance sensor.

Referring now to FIG. 2, FIG. 4A, and FIG. 4B, in accordance with an embodiment the parametric disturbance sensor 100 has a cable-end connector 202. The cable end connector 202 is configured to connect the stripline sensor core 200 to a processing unit. This allows information to be transported from the stripline sensor core 200 to the processing unit. The processing unit is, at least partially, for processing ETDR signals.

In an example embodiment, a coaxial RF connector such as a SMA or SMB connector may be used as a cable end connector. A skilled person would understand that other connectors could be used that would be within the scope of this disclosure. For example, a SMC or other suitable connector may also be used without departing from the scope of this disclosure.

Referring again to FIG. 1 and FIG. 2, in accordance with an embodiment the cable end enclosure further includes a cable end cap 112. The cable end cap 112 acts as a cover for an open end of the cable end enclosure 108. The cable end cap 112 prevents dirt, environmental debris, and/or moisture from entering the cable end enclosure 108 by covering, at least in part, the cable end enclosure 108. This helps to protect the cable end connector 202 and any other components within the cable end enclosure 108 from environmental exposure and damage.

Referring again to FIG. 1, the stripline enclosure 102 has an end cap 104. The end cap 104 is positioned at the end of the stripline enclosure 102 that is opposite the cable end enclosure 108. The end cap 104 is configured to seal the stripline enclosure 102 at one end so that once the parametric disturbance sensor 100 is filled the fill material 600 does not exit the stripline enclosure 102. The end cap also prevents debris and moisture, at least in part, from entering the stripline enclosure 102.

The end cap 104 is attached to the stripline enclosure 102 using any suitable means. In the example provided in FIG. 1, the end cap 104 is welded to the stripline enclosure 102. A skilled person would understand that alternate methods of attaching the end cap 104 to the stripline enclosure 102 can be used without departing from the scope of this disclosure.

For instance, the end cap 104 can be press-fit into the stripline enclosure. Alternately, the end cap 104 can be glued, soldered, or clipped into the stripline enclosure 102.

The end cap 104 should be sufficiently resilient for use in a traffic monitoring environment. In one example embodiment, the end cap 104 is aluminum. Other suitable materials can be used without departing from the scope of this disclosure. For example, a plastic, rubber, or steel alloy end cap 104 could also be used.

Referring again to FIG. 2 and FIG. 3, a stripline sensor core (200) is positioned within the internal chamber. The stripline sensor core 200 is configured to generate, at least in part, an impedance change once a force is exerted on the parametric disturbance sensor 100. In another embodiment, the stripline sensor core 200 is configured to generate, at least in part, an impedance change once a force is exerted on the sensor core 200.

In the example embodiment depicted in FIG. 2, the stripline sensor core 200 is approximately centered in the stripline enclosure 102. It should be noted, however, that the stripline sensor core 200 can be positioned anywhere within the stripline enclosure 102, including contacting an inner wall of an internal chamber of the stripline enclosure 102.

The parametric disturbance sensor 100 also includes a fill material 600. The fill material 600 fills the internal chamber 110 of the stripline enclosure 102 so that the stripline sensor core 200 does not move within the internal chamber 110 of the stripline enclosure 102. Or, the stripline sensor core 200 is stabilized within the internal chamber 110.

In an embodiment, the fill material also mechanically transmits and/or connects, at least in part, a force applied to the stripline enclosure 102 to the stripline sensor core 200.

In an embodiment, the fill material may also used to electrically isolate the stripline sensor core 200 from the stripline enclosure 102.

In another embodiment, the stripline sensor core 200 may be electrically connected to the stripline enclosure 102. It may be beneficial to connect the stripline enclosure 102 electrically to the ground planes 800 and 808 for shielding the sensor core 200 electrically from any radio frequency (RF) interference. Also, although the risk of static charge buildup in the sensor core 200 is low because the sensor core 200 may be encapsulated within the filler material, the risk of static charge buildup would be about zero if the stripline enclosure 102 is electrically connected to the ground planes 800 and 808 for grounding.

Referring now to FIG. 4A, a stripline sensor core 200 and positioning blocks 404 of an example embodiment parametric disturbance sensor 100 are depicted.

Generally, one or more positioning blocks 404 are configured to position the stripline sensor core 200 within the internal chamber 110. In this embodiment, the one or more positioning blocks 404 are in contact with both the stripline sensor core 200 and an inner wall 406 of the internal chamber 110. The positioning blocks 404 may also be used to prevent the stripline sensor core 200 from directly contacting the inner wall 406 of the internal chamber 110.

In the example depicted in FIG. 4A, the positioning blocks 404 include horizontal positioning blocks 402 and vertical positioning blocks 400. The vertical positioning blocks 400 are used to position the stripline sensor core 200 along a vertical axis in the internal chamber 110 of the stripline enclosure 102. The horizontal positioning blocks 402 are used to position the stripline sensor core 200 along a horizontal axis in the internal chamber 110 of the stripline enclosure 102.

The horizontal positioning blocks 402 contact the inner wall of the internal chamber 110 of the stripline enclosure 102 so that the sensor can be positioned along a horizontal axis of the internal chamber 110 of the stripline enclosure 102. In an example embodiment, a spring steel positioning block is configured to span a horizontal axis of internal chamber 110 of the stripline enclosure 102. The spring steel positioning block is also glued to the stripline sensor core 200 so that the stripline sensor core 200 is approximately horizontally centered in the internal chamber 110 of the stripline enclosure 102.

The vertical positioning blocks 400 contact opposing inner walls of the internal chamber 110 of the stripline enclosure 102 so that the sensor can be positioned along a vertical axis of the internal chamber 110. In an example embodiment, a urethane positioning block is configured to span a vertical axis of internal chamber 110. The urethane positioning block is also glued to the stripline sensor core 200 so that the stripline sensor core 200 is approximately vertically centered in the internal chamber 110.

In the example embodiments provided above the horizontal positioning blocks 402 are made with spring steel. The vertical positioning blocks 400 are made with urethane. A skilled person, however, would understand that any suitable material could be used as a horizontal positioning block 402 or a vertical positioning block 400 without departing from the scope of this disclosure. For example, rubber could be used as a horizontal positioning block 402, vertical positioning block 400, or both.

Referring again to FIG. 4A, in the example depicted in FIG. 4A the positioning blocks (404) are attached to the stripline sensor core (200).

In this example both the horizontal positioning blocks 402 and the vertical positioning blocks 400 are attached to the stripline sensor core 200. In an example embodiment, the vertical positioning blocks 400 and horizontal positioning blocks 402 are glued to the stripline sensor core 200. A skilled person would understand that other ways of attaching the vertical positioning blocks 400 and horizontal positioning blocks 402 may be contemplated without departing from the scope of this disclosure. For instance, the positioning blocks 404 may be welded or soldered onto the stripline sensor core 200. Alternately, the positioning blocks 404 may be mechanically attached to the stripline sensor core 200 using screws, clips, rivets, friction fit, or similar fastening means.

Referring now to FIG. 4B, a stripline sensor core 200 and positioning blocks 404 of an alternate example parametric disturbance sensor 100 are depicted. In this example the positioning blocks 404 are configured to position the sensor both vertically and horizontally in the internal chamber of the stripline enclosure. That is, the positioning block 404 performs the function of both the vertical positioning block 400 and horizontal positioning block 402 could also be combined to form a block or strip that would position the sensor both vertically and horizontally.

Alternate ways of positioning the stripline sensor core 200 can be contemplated without departing from the scope of disclosure. For example, the stripline sensor core 200 might be enclosed in a wrapping or webbing that is configured to position, at least in part, the stripline sensor core 200.

Figure 5:
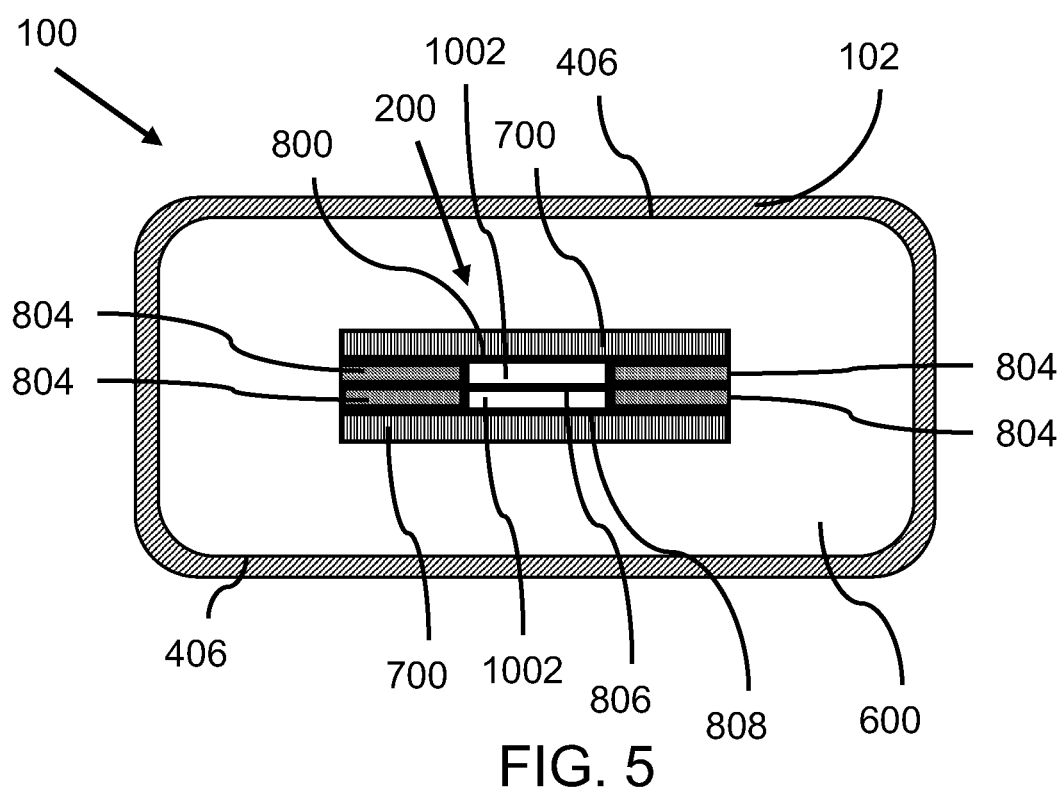
FIG. 5 [PAGE 4/10] depicts a cross sectional view along FIG. 1 line A-A showing a stripline enclosure, a stripline sensor core, and a fill material of an example embodiment parametric disturbance sensor.

Referring now to FIG. 5, the fill material 600 is configured to fill the internal chamber 110 of the stripline enclosure 102 so that a force applied to the stripline enclosure 102 is mechanically transferred, at least in part, to the stripline sensor core 200.

The fill material 600 may be selected to cooperate with the input dynamic range of the analog electronics and the output of the stripline sensor core 200. As the fill material 600 expands or contracts due to environmental factors, the fill material 600 exerts a varying amount of pressure on the stripline sensor core 200 and the stripline enclosure 102. This change in pressure being exerted on the stripline sensor core 200 and the stripline enclosure 102 affects the output of the sensor core 200.

In this case, the analog electronics would also have to be configured to match this change in output range for the stripline sensor core 200. If the dynamic range of the input of the analog electronics is not correctly tuned to account for the variable pressure exerted by the fill material 600 on the stripline sensor core 600 under varying environmental conditions, then the output of the stripline sensor core 200 may not be properly received. That is, the sensor will be providing a signal response outside of the dynamic range of the analog electronics.

For example, in an embodiment, consider a parametric disturbance sensor 100 with the analog electronics configured to have a dynamic range of 47-53 ohms. In this example, once the fill material 600 expands due to heat, the output of the compressed stripline sensor core 200 may drop below 45 ohms. Once this occurs, the signal response of the stripline sensor core 200 no longer matches the tuning of the analog electronics. Although the stripline sensor core 200 is still responsive to the load, the resulting signal output from the stripline sensor core 200 would be below 45 ohms and is outside the dynamic range of the analog electronics. It is understood that the fill material 600 may exert more pressure or less pressure on the stripline sensor core 200 depending on the fill material's properties or environmental factors or both.

In an embodiment, the dynamic range of the input of the analog electronics may be tuned to account for the output range of the stripline sensor core 200 when variable pressure is exerted on the stripline sensor core 200 by the fill material 600. In another embodiment, the fill material 600 is selected for various reasons as described below.

The fill material 600 may be selected so that high environmental temperatures will not cause the fill material 600 to expand and cause an undue deformation of the stripline sensor core 200. That is, the fill material 600 should have a sufficiently low thermal expansion coefficient so that high temperatures frequently found in vehicular measurement systems will not cause the fill material 600 to expand and cause an undue deformation of the stripline sensor core 200.

The fill material 600 may also be selected so that the output of the sensor remains constant despite change in environmental factors such as temperature.

The fill material 600 may also have a low enough viscosity so that the fill material is able to flow into empty spaces defined in the internal chamber 110 of the stripline enclosure 102. This will help to ensure that any forces applied on the stripline enclosure 102 will be transferred, at least in part and via the fill material 600, to the stripline sensor core 200.

In an example embodiment the fill material 600 is a urethane mix comprising a mixture of urethane and silica sand. In this example embodiment, the urethane mix is sufficiently viscous so as to fill any empty space in the internal chamber 110 of the stripline enclosure 102. Furthermore, the thermal properties of silica sand allow for a tuning of the thermal properties of the urethane mix so that high temperatures would not cause an undue deformation of the stripline sensor core 200.

In other example embodiments the fill material 600 may be configured to harden over time to become a solid. For instance, the fill material 600 may initially be in a fluid state when poured into the internal chamber 110 then allowed to harden to a solid. Examples of such fill materials include epoxies, plastics, urethanes, silicones, and curable plastics.

In another example embodiment, the base impedance of the parametric disturbance sensor 100 can be adjusted, at least in part, by adjusting the pressure of the fill material 600 once the stripline enclosure 102 is filled with fill material 600. The pressure of the fill material 600 in the stripline enclosure 102 pre-loads, at least in part, the stripline sensor core 200. The pre-loaded stripline sensor core 200 would then have a baseline impedance once the parametric disturbance sensor 100 is finally assembled.

An example method of setting a base impedance of the parametric disturbance sensor 100 is provided. In another embodiment, it is a method of manufacturing a parametric disturbance sensor. In this method, the stripline sensor core 200 is positioned in a stripline enclosure 102 and is connected, via the cable end connector 202 and cable 106, to a processing device that displays the impedance value of the stripline sensor core 200. As a pressurized fill material 600 is injected into the internal cavity 110 of the stripline enclosure 102, the impedance of the stripline sensor core 200 changes and is displayed via the processing device. Once a desired baseline impedance value is reached the injection of the fill material 600 into the internal cavity 110 is stopped. Then, the fill material is cured, that is, the fill material 600 transitions from a liquid to a solid. An example of a desired baseline impedance value is 50 ohms.

In an embodiment, the stripline sensor core may be positioned in the center of the internal cavity 110. In another embodiment, the stripline sensor core may also be positioned near a force receiving side of the stripline enclosure. In another embodiment, the stripline sensor core may be positioned in contact with a force receiving side of the stripline enclosure.

Figure 6:
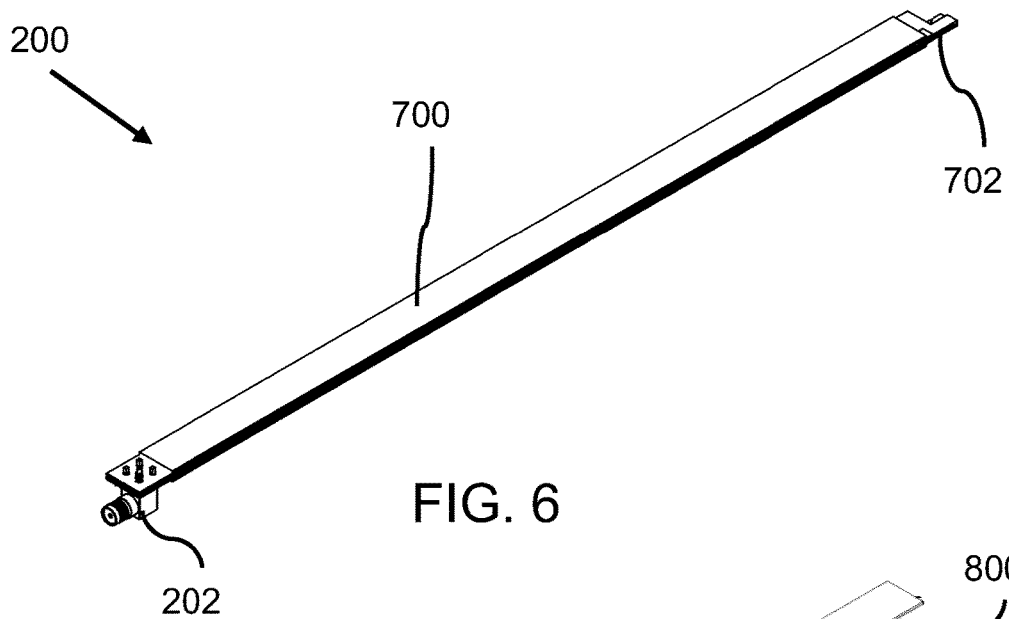
FIG. 6 [PAGE 5/10] depicts a perspective view of a stripline sensor core of an example embodiment parametric disturbance sensor.
Figure 7:
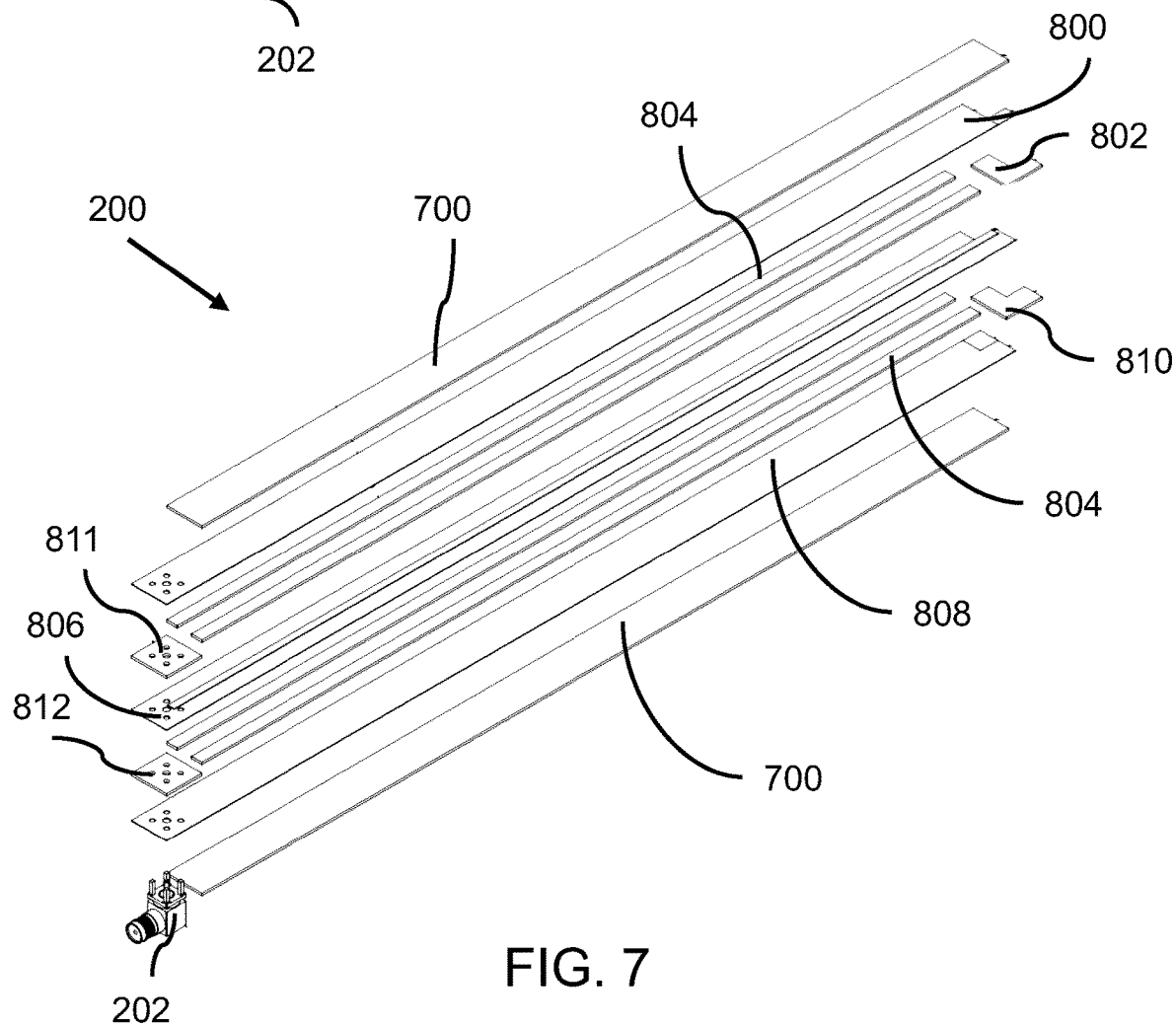
FIG. 7 [PAGE 5/10] depicts an exploded perspective view of the stripline sensor core of FIG. 6.

Referring now to FIG. 6 and FIG. 7, an example embodiment of a stripline sensor core is depicted. The stripline sensor core 200 includes a first ground plane 800, a second ground plane 808, and a center trace 806. In an embodiment, the stripline sensor core 200 is a flat planar shape. In another embodiment, the stripline sensor core 200 is a flat planar rectangular shape. In another embodiment, the center trace 806, the first ground plane 800, and the second ground plane 808 of the stripline sensor core are substantially parallel to each other. In another embodiment, a force receiving side of the stripline enclosure, the center trace 806, the first ground plane 800, and the second ground plane 808 of the stripline sensor core are substantially parallel to each other.

Figure 12A:
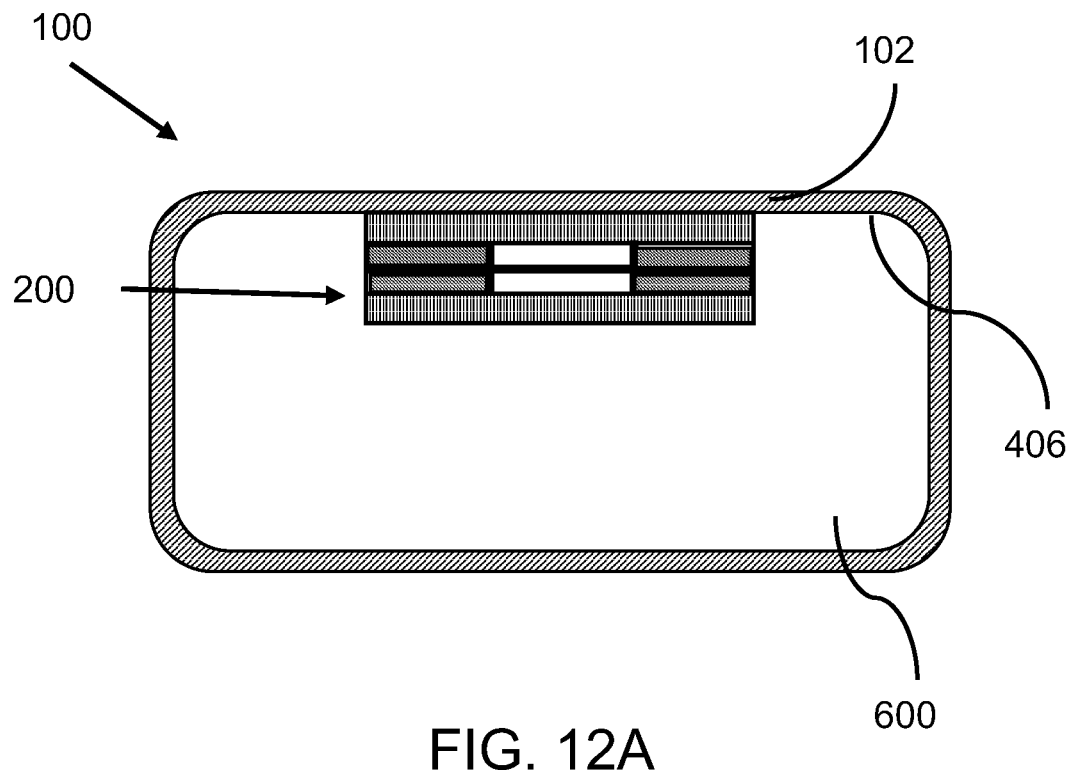
FIG. 12A [PAGE 10/10] depicts a cross sectional view of the embodiment of the parametric disturbance sensor of FIG. 11.
Figure 12B:
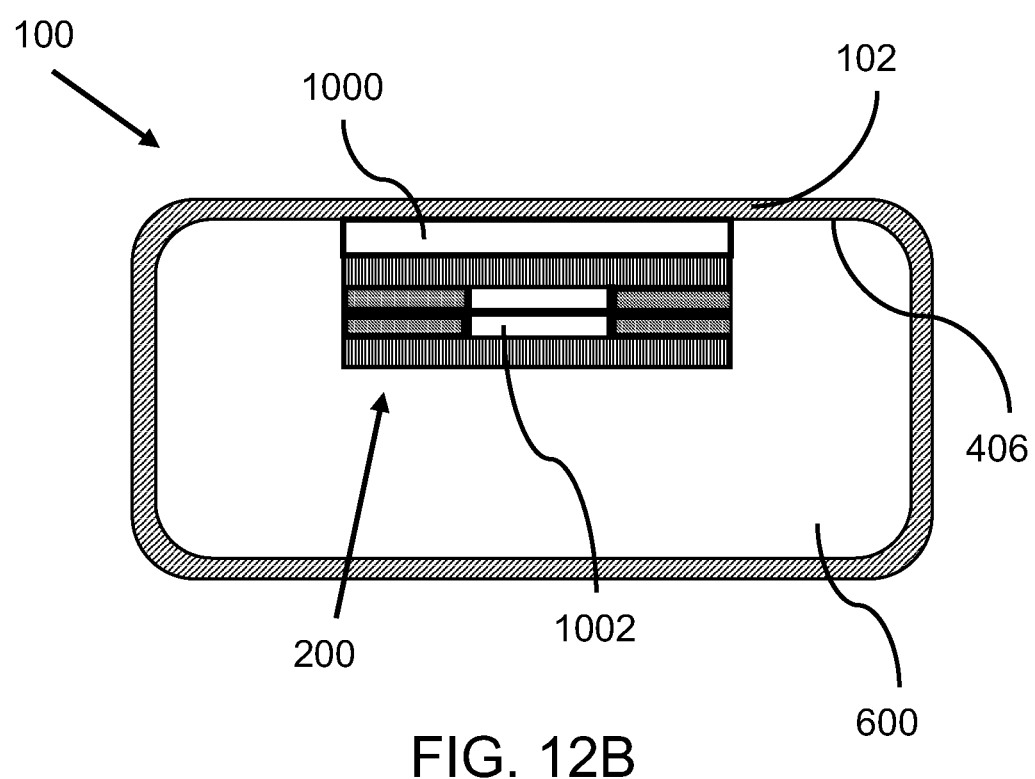
FIG. 12B [PAGE 10/10] depicts a cross sectional view of the embodiment of the parametric disturbance sensor.

It will be appreciated that a force receiving side of the stripline enclosure is configured to receive a force. In the embodiment where the parametric disturbance sensor 100 is embedded in a roadway, the force receiving side of the stripline enclosure is the side of the stripline enclosure that is closest to a surface of a roadway. It will be appreciated that any side of the stripline enclosure closest to an applied force can be considered a force receiving side of a stripline enclosure. FIG. 12A and FIG. 12B illustrate an example of the above embodiment.

The stripline sensor core 200 is configured to detect, at least in part, a force exerted on the parametric disturbance sensor. In the example provided in FIG. 6 and FIG. 7, a force is transmitted, at least in part, from the stripline enclosure 102 to the stripline sensor core 200 through the fill 600. This force deforms, at least in part, the first ground plane 800, second ground plane 808, or both.

In this example embodiment, an electrical signal is transmitted to the unloaded parametric disturbance sensor 100. The parametric disturbance sensor 100 has a baseline impedance. As a force is exerted on the parametric disturbance sensor 100, the deformation of the first ground plane 800, second ground plane 808, or both changes the impedance of the parametric disturbance sensor 100. This changes the electrical signal. This change in electrical signal is then used to determine characteristics of the force applied to the parametric disturbance sensor 100.

In the example depicted in FIG. 6 and FIG. 7, the first ground plane 800, second ground plane 808, and center trace 806 are electrically connected. In some example embodiments, the first ground plane 800, second ground plane 808, and the center trace 806 are electrically connected by the cable-end connector 202 at one end, and using a pin, wire, or similar electrical connection at the opposite end. Once the first ground plane 800, second ground plane 808, and the center trace 806 are electrically connected, an electrical circuit is formed.

In an embodiment, the center trace 806 is electrically separated from the ground planes (800 and 808) at the end away from the cable end using a resistor which matches the impedance of the electrical circuit. For example, a 50 ohm resistor. In this embodiment, it is a requirement for the ETDR equipment or ETDR processing unit, and may be different if we had different ETDR equipment or ETDR processing unit. In other embodiments, it is possible to create a sensor core 200 whereby: the center trace 806 was directly connected to the ground planes (800 and 808) in a short circuit configuration; the center trace 806 was not connected to ground planes (800 and 808) at all in an open circuit configuration; and, the center trace was connected to the ground planes (800 and 808) by a resistor of a selected resistance.

In the example depicted in FIG. 6 and FIG. 7, the first ground plane 800 and second ground plane 808 are supported and separated from the and center trace 806, at least in part, using printed circuit boards (PCBs). In these examples, the first ground plane PCB 802, second ground plane PCB 810, first ground plane cable end PCB 811, and second ground plane cable end PCB 812 are used to mechanically support and separate, at least in part, the first ground plane 800 and the second ground plane 808 from the center trace 806. In the above example, the ground plane PCBs also act as spacers and are not deformable. The ground plane PCBs are not deformable for not breaking the solder joints.

In other example embodiments, PCBs may also be used to electrically connect, at least in part, the first ground plane 800, second ground plane 808, and the center trace 806. In this example, the first ground plane 800 is electrically connected to a first ground plane PCB 802. Similarly, the second ground plane 808 is electrically connected to a second ground plane PCB 810.

The center trace 806 is configured to contact, at least in part, the first ground plane PCB 802 and the second ground plane PCB 810. Once the first ground plane PCB 802 and second ground plane PCB 810 are connected the first ground plane 800, second ground plane 808, and center trace 806 are electrically connected.

In this example embodiment, the first ground plane PCB 802 and the second ground plane PCB 810 are connected by soldering the first ground plane PCB 802 and the second ground plane PCB 810 together. A skilled person would understand that alternative ways of connecting the first ground plane PCB 802 and the second ground plane PCB 810 can be contemplated. For example, the two PCBs could be attached by welding or using an adhesive, clips, screws, bolts, or other attachment means.

In the example provided in FIG. 7 the center trace 806 is separated from the first ground plane 800 and the second ground plane 808 by one or more separators 804. The separators 804 are configured to separate the first ground plane 800 and the second ground plane 808 from the center trace 806.

The separators 804 are further configured to isolate the center trace 806 from the first ground plane 800 and the second ground plane 808. This isolation can be either physical, electrical, or both.

In the example provided in FIG. 7, the separators 804 are made of an electrically insulating foam such as a polyethylene closed-cell foam. A skilled person would understand that other materials could be used as a separator 804 without departing from the scope of this disclosure. For instance, rubber, plastic, or other suitable materials could be used as a separator 804.

The spacer 804 between the center trace 806 and the two ground planes (800 and 808) may be chosen for a few reasons including rebound, dimensional tolerance, and loss tangent. Although, solid materials (rather than foam) including rubber and silicone result in a functioning embodiment, the attenuation may be too high to be acceptable. Also, in another embodiment, using a foam as a separator 804 on the whole ground plane surface resulted in a functioning embodiment although the attenuation may be too high to be acceptable. The sensor core 200 with an air gap 1002 is a preferred embodiment.

In another embodiment, one moving ground plane (e.g. the ground plane 800 deflects towards the center trace 806) and one ground plane (e.g. the ground plane 808) at a fixed distance, resulted in a functioning embodiment although the sensitivity may not be as regular as desired. The closed cell foam as a separator 804 has a loss tangent similar to air, which is preferable. The closed cell foam as a separator 804 may be selected to rebound well when compressed. The closed cell foam may also be selected for precise dimensional tolerances.

The base impedance of the sensor 100 can be tuned, at least in part, by adjusting a distance between a first ground plane 800 and a second ground plane 808 to the center trace 806 of the sensor core 200. In the example provided in FIG. 6 and FIG. 7, the distance between a first ground plane 800 and a second ground plane 808 to the center trace 806 can be adjusted by varying the height of the separators 804 between the center trace 806 and the first ground plane 800, the second ground plane 808, or both.

In another example embodiment, the base impedance of the sensor 100 can be tuned, at least in part, by adjusting the width of the center trace 806 of the stripline sensor core 200. That is, the characteristic impedance of the sensor can be increased or decreased by decreasing or increasing the width of the electrically conductive portion of the center trace 806.

Other ways of adjusting the base impedance of the sensor 100 include, but are not limited to, adjusting the distance between the copper center trace 806 and the ground planes (800 and 808) by the foam height 804, the width of copper ground planes (800 and 808), and/or the width and/or height of the air gap 1002. The width of the air gap 1002 is adjusted by the width of the center trace 806, the width of the foam/separator 804, and the and the overall width of the stripline sensor core 200. In an embodiment, the overall width of the stripline sensor core 200 is defined by the width of the center trace PCB, the width of the first ground plane PCB, and the width of the second ground plane PCB.

As the first ground plane 800, second ground plane 808, or both, deforms on the application of a force on the parametric disturbance sensor 100, the impedance of the sensor changes from the baseline impedance. This change in impedance is then used to determine certain properties of the load being exerted on the parametric disturbance sensor 100. Properties of the load being exerted on the parametric disturbance sensor 100 include, but are not limited to, the location of the load on the sensor, the pressure of the load on the sensor, the width of the load on the sensor, and the center of the load on the sensor. Additional information can include the number of axles, weight per axle, weight per wheel, vehicle weight, wheel count, wheel spacing, axle spacing, inter-axle spacing, axle width, and axle and/or vehicle speed. Aggregate information may also be collected such as the total number of vehicles detected by the sensors. In an embodiment, both the first ground plane 800 and the second ground plane 808 deform or deflect towards the center trace 806 on the application of a force on the sensor core 200.

The change in impedance, deflection of the sensor core, or signal generated, can vary in size (amplitude) depending on a variety of factors that can be adjusted, at least in part, when constructing the sensor core 200. These include, but are not limited to, the position of the sensor core stiffeners 700 on or in the sensor core 200, deflection properties of the sensor core 200, stripline enclosure 102 deflection properties, the position of the sensor core 200 in the stripline enclosure 102, and the type of fill material 600 used. By adjusting these parameters the signal size of the signal can be tuned.

Similarly, the consistency of the signal can be controlled and/or adjusted if so desired. This can be done in a variety of ways including, but not limited to, the consistency of the materials being used to build the sensor core 200, the stripline enclosure 102, the fill material 600, and, positioning of the sensor core 200 within the stripline enclosure 102. In an embodiment, the consistency of the signal is controlled or adjusted so the consistency is maximized.

The attenuation of the signal down the length of the sensor core 200 can be controlled, at least in part, by adjusting the height and width of the air gap 1002 between the first ground plane 800, the second ground plane 808, and the center trace 806. The height distance between the ground planes (800 and 808) and the center trace 806 is adjust by adjusting the separator 804 height. The width of the air gap 1002 is adjusted by the width of the center trace 806, the width of the foam/separator 804, and the overall width of the stripline sensor core 200. In an embodiment, the overall width of the stripline sensor core 200 is defined by the width of the center trace PCB, the width of the first ground plane PCB, and the width of the second ground plane PCB.

The longevity of the signal emitted from the sensor core 200 can also be adjusted, at least in part. This can be done by adjusting the amount the sensor core 200 deflects (as a percentage of its height, for example), adjusting the amount of the deflection of the enclosure 102, adjusting the type of fill material 600 used, and/or selecting the materials used as a separator 804. In an embodiment, the longevity of the signal may be adjusted to minimize or maximize signal longevity as required by the ETDR equipment or ETDR processing unit.

Referring again to FIG. 6 and FIG. 7, the stripline sensor core 200 includes one or more sensor core stiffeners 700. The sensor core stiffeners 700 are used to stiffen the sensor core 200 for maintaining stability of the sensor core 200 during the manufacturing process. Also, the sensor core stiffeners 700 transfer, at least in part, a force on the sensor core 200 once a force is exerted, at least in part, on the sensor core stiffeners 700.

In the example depicted in FIG. 6 and FIG. 7, the sensor core stiffeners 700 are configured adjacent to a first ground plane 800 of the stripline sensor core 200. A second sensor core stiffener is configured adjacent to a second ground plane 808 of the stripline sensor core 200.

The sensor core stiffeners 700 are configured to stiffen the sensor core 200 and thereby reduce the sensor core's 200 tendency to flex and/or twist. In this example embodiment the sensor core stiffeners (700) have a similar size and shape to the sensor core 200. In this example, the sensor core stiffeners 700 are strips made of spring steel.

In the example depicted in FIG. 6 and FIG. 7, a force exerted on the stripline enclosure 102 may be transmitted, at least in part, via the fill material 600 to the sensor core stiffeners 700. The sensor core stiffeners 700 then distribute, at least in part, the force to the sensor core 200. This force distribution may manifest itself in a variety of ways, including a deformation, flex, or compression of the sensor core stiffener 700.

The sensor core stiffener 700 may also be configured to absorb, at least in part, the force exerted on the sensor core 200. Thus, the sensor core stiffener 700 may be used to protect, at least in part, the sensor core 200 from excessive compression or other excessive forces, thereby preventing damage to the sensor core 200.

The amount of force absorbed and transferred by the sensor core stiffeners 700 will depend on the shape of the sensor core stiffeners and the materials used, among other factors. For instance, the amount of force absorbed and distributed by a spring steel core stiffener may differ from a strip aluminum core stiffener, a line-shaped aluminum core stiffener, or a cylindrical stainless steel core stiffener.

A skilled person would understand that alternate shapes or materials could be used for the sensor core stiffeners 700 without departing from the scope of this disclosure. For instance, a line-shaped aluminum core stiffener or a cylindrical stainless steel core stiffener running along the length of the stripline sensor core 200 may also be used without departing from the scope of this disclosure.

Furthermore, in another embodiment the sensor core is sufficiently resilient so as to not require the addition of sensor core stiffeners 700.

In another example embodiment, a wrap (not shown) is provided. The wrap surrounds the stripline sensor core 200. The wrap is configured to prevent the fill material 600 from entering the stripline sensor core 200.

In some example embodiments the wrap is applied to the sensor core 200 before the positioning block 400, the sensor core stiffener 700, or both, are applied. In another example embodiment the positioning blocks 400 and the sensor core 200 may be wrapped together. In yet another example embodiment, the sensor core 200 and the sensor core stiffener is wrapped together.

The wrap material used should be suitably resilient so that fill material 600 (and other environmental debris) will not enter the sensor core 200 once the internal chamber 110 of the stripline enclosure 102 is filled with fill material 600. The wrap material should also be sufficiently flexible so as to provide little to no space between the sensor core 200 (and/or positioning block 400 and/or sensor core stiffener 700) and the wrap.

In an example embodiment a heat shrink is used as a wrap. In this example the sensor core 200 and optionally the sensor core stiffener 700 and/or positioning block 400 are wrapped in a heat shrink material. Heat is then applied to the heat shrink, causing the heat wrap to shrink around the sensor core 200, sensor core stiffener 700, and/or positioning block 400 assembly.

A skilled person would understand that alternate materials could be used to wrap the sensor core 200/sensor core stiffener 700/positioning block 400 assembly without departing from the scope of this disclosure. For example, a plastic film wrap, rubberized dip coating, or any other sealing wrap or dip material could also be used.

Figure 8A:
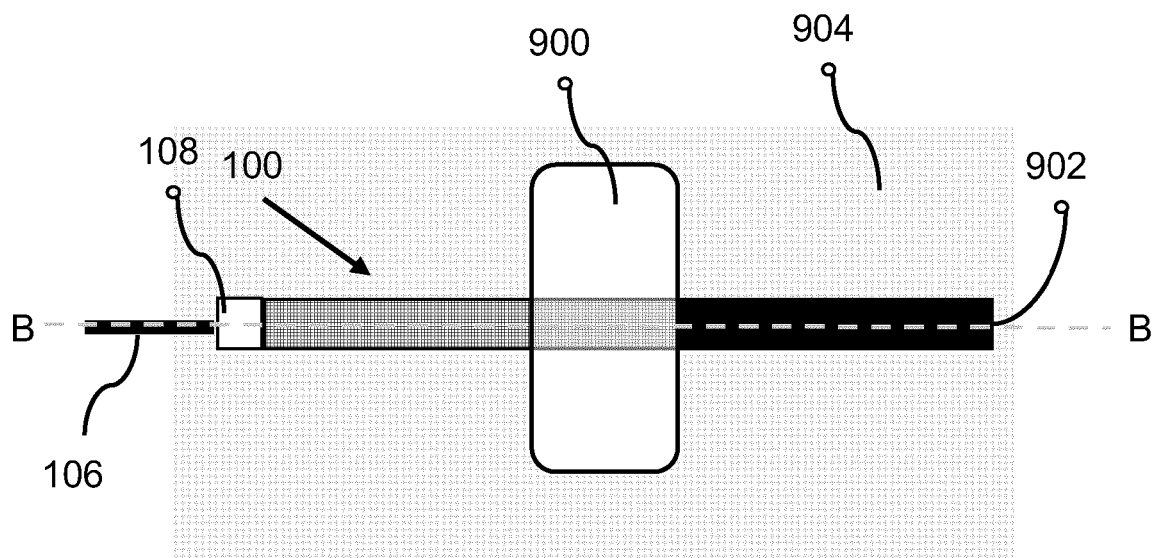
FIG. 8A [PAGE 6/10] depicts a representative top down view of a vehicle having a wheel and an axle crossing over a parametric disturbance sensor embedded in a road.
Figure 8B:
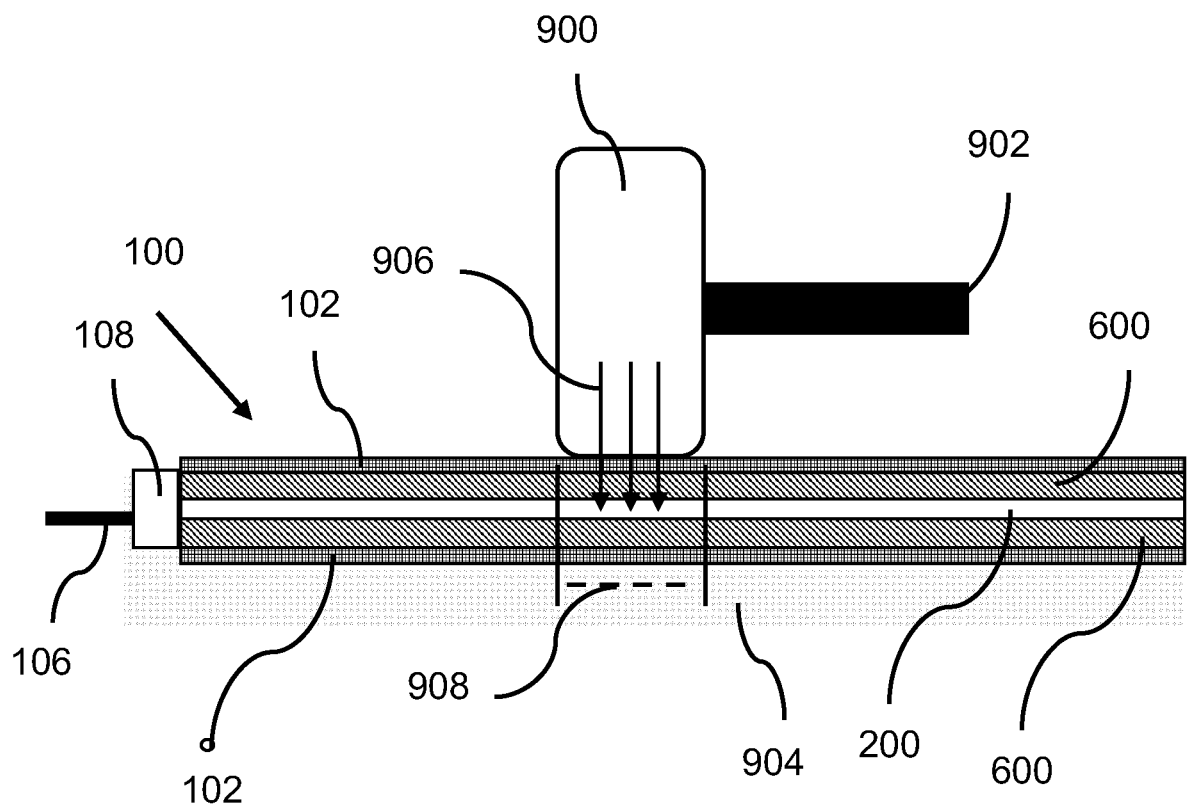
FIG. 8B [PAGE 6/10] depicts a representative front view cross section (along the plane marked B-B in FIG. 8A) of the vehicle of FIG. 8A crossing over a parametric disturbance sensor embedded in a road.

Referring now to FIG. 8A and FIG. 8B, an example of how the parametric disturbance sensor 100 might be used in a road 904 is provided. FIG. 8A depicts a representative top down view of a vehicle having a wheel 900 and an axle 902 crossing over a parametric disturbance sensor 100 embedded in a road 904. FIG. 8B depicts a representative front view cross section (along the plane marked B-B in FIG. 8A) of the vehicle of FIG. 8A crossing over a parametric disturbance sensor 100 embedded in a road 904.

In the example depicted in FIG. 8A and FIG. 8B, a parametric disturbance sensor as disclosed is a part of a vehicle monitoring system. Examples of a vehicle monitoring system include, but are not limited to, a weigh in motion (WIM) system.

In this example the parametric disturbance sensor 100 is embedded in a road 904. The parametric disturbance sensor 100 is electrically connected to a processing unit, in this example a vehicle monitoring system, through the cable 106. Once the wheel 900 contacts the parametric disturbance sensor 100, a force 906 is exerted on the parametric disturbance sensor 100. The force 906 is exerted, approximately, across an area represented by the contact patch 908. The force 906 causes the parametric disturbance sensor 100, and in particular the stripline sensor core 200, to be elastically deformed. This elastic deformation causes the impedance of the parametric disturbance sensor 100 to change from its baseline impedance.

In this example embodiment, the force 906 is transferred, at least in part, from the stripline enclosure 102 to the stripline sensor core 200 through the fill material 600. In this example embodiment, the fill material 600 is sufficiently resilient so as to transfer the force, at least in part, from a contact patch 906 on the stripline enclosure 102 (i.e., the wheel contact point) to an area on the stripline sensor core 200 that is approximately in-line and parallel with the contact patch 908 on the stripline enclosure 102. The force 906 exerted on the localized area of the stripline sensor core 200 deforms the stripline sensor core 200. This deformation causes the impedance of the stripline sensor core 200 to change from its baseline impedance at that localized area.

Using electrical time domain reflectometry (ETDR) principles, when an incident wave meets the change in the baseline impedance (or discontinuity), a reflected wave is generated. This reflected wave is then transmitted through the cable 106 to the vehicle monitoring system. TDR techniques can then be used to then determine the magnitude and the location of the discontinuity from the reflected wave.

This information can then be used to determine properties of the force 906 exerted on the parametric disturbance sensor 100. These properties include, but are not limited to, the number of axles, weight per axle, weight per wheel, vehicle weight, wheel count, wheel spacing, axle spacing, wheel width, inter-axle spacing, axle width, and axle and/or vehicle speed. The vehicle monitoring system may also collect aggregate information. This can include, but is not limited to, the total number of vehicles detected by the sensors.

In some embodiments the parametric disturbance sensor 100 includes a coating that adds additional protection from the environment. This is useful in environments where salt, water, snow, moisture, dirt, etc., is prevalent.

The coating can be applied using any known method including, but not limited to wrapping, dipping, spraying, painting, etc.

Figure 9:
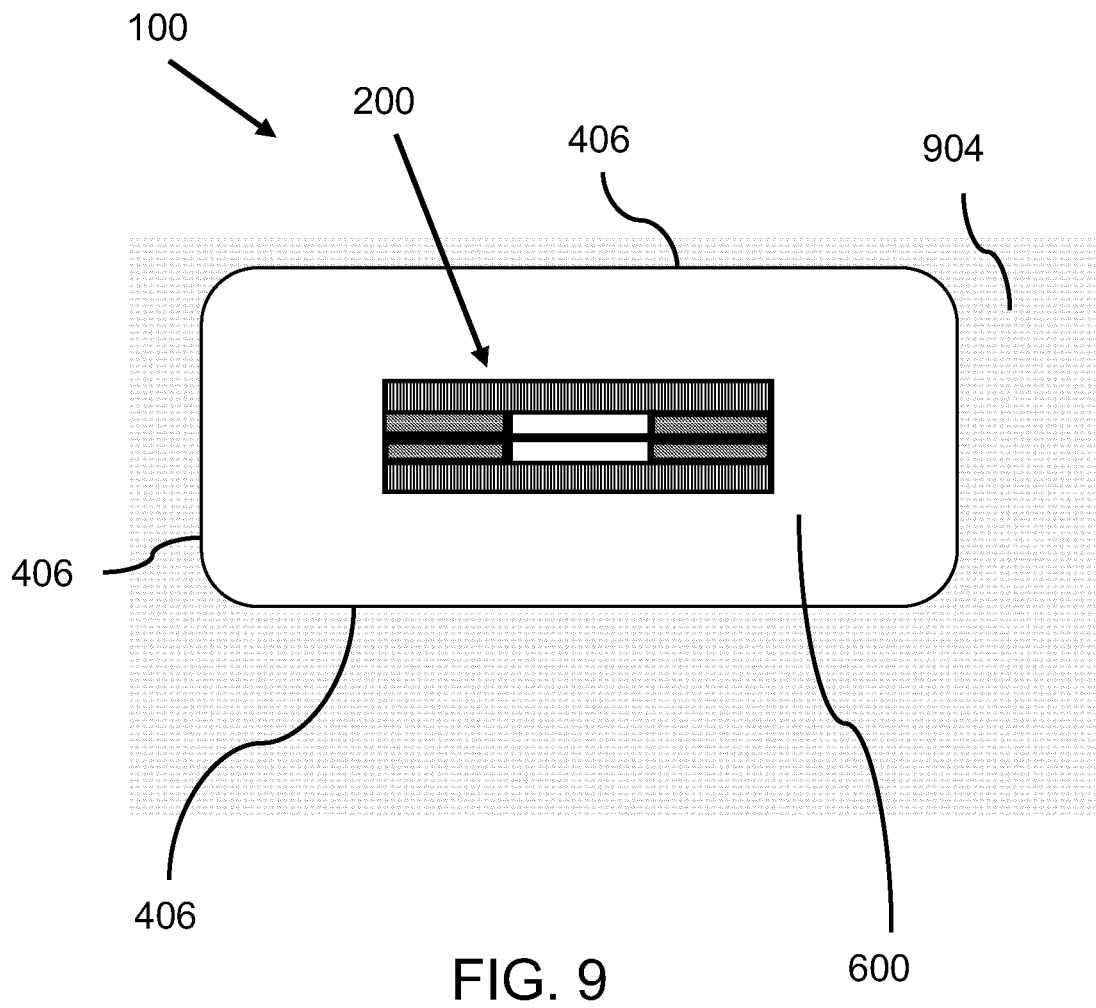
FIG. 9 [PAGE 7/10] depicts a cross sectional view of an alternate embodiment of a parametric disturbance sensor showing a stripline sensor core and a fill material embedded in a roadway.
Figure 10A:
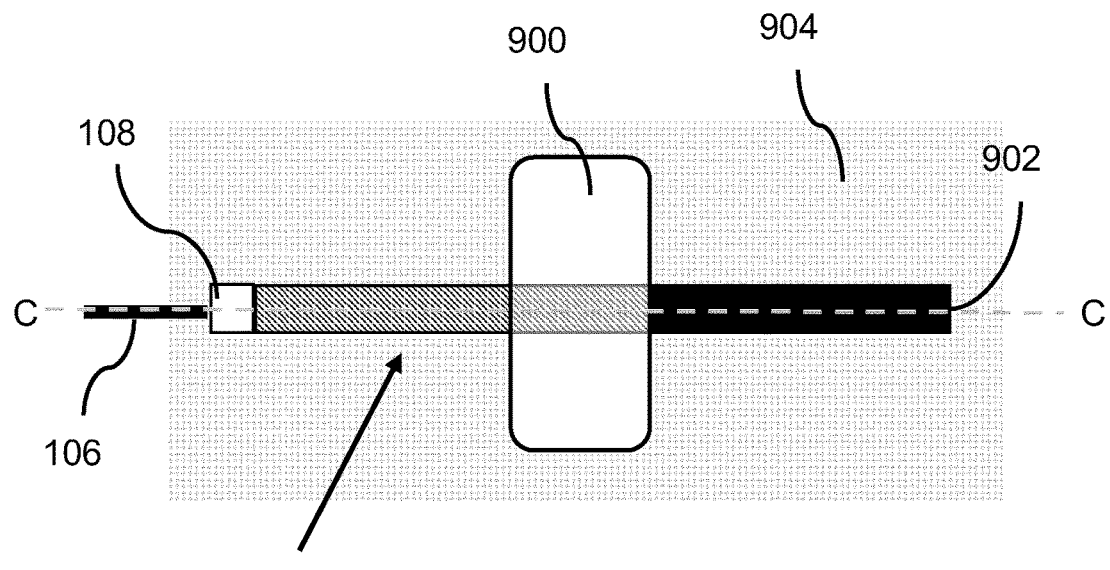
FIG. 10A [PAGE 8/10] depicts a representative top down view of a vehicle having a wheel and an axle crossing over the parametric disturbance sensor of FIG. 9 embedded in a road.
Figure 10B:
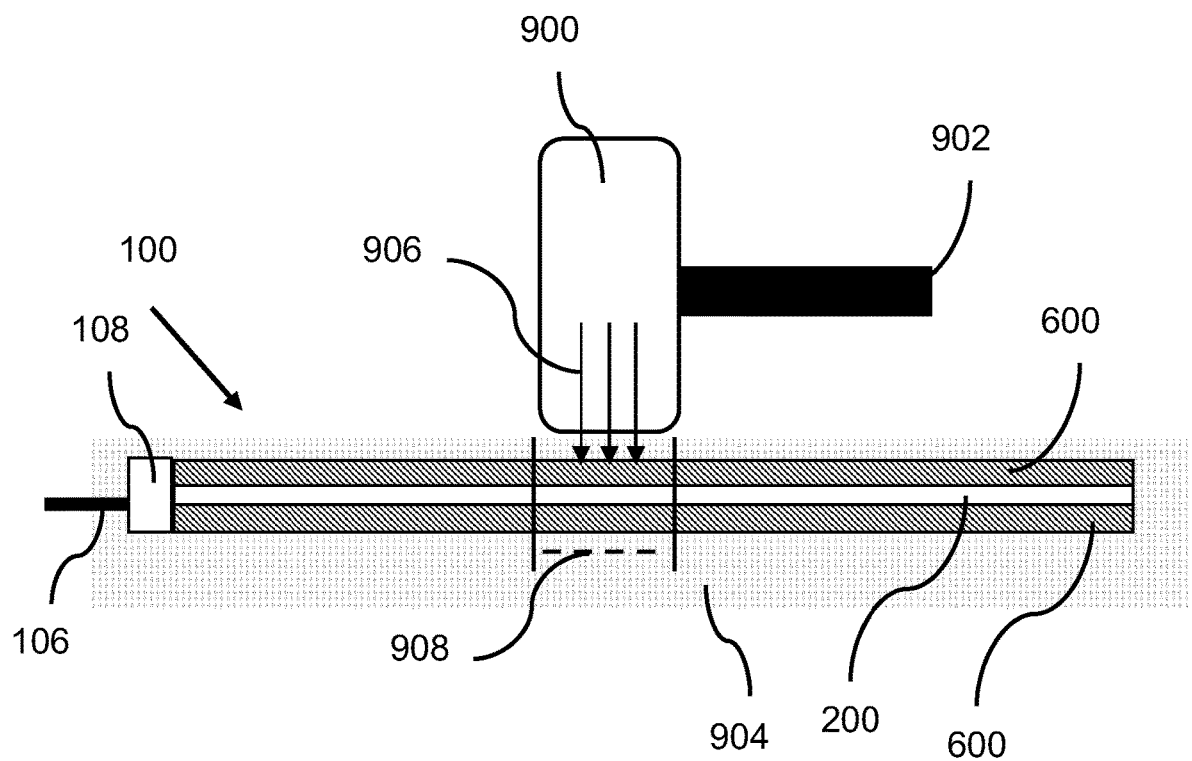
FIG. 10B [PAGE 8/10] depicts a representative front view cross section (along the plane marked C-C in FIG. 10A) of the vehicle of FIG. 10A crossing over a parametric disturbance sensor embedded in a road.

Referring now to FIGS. 9, 10A, and 10B, an alternate example embodiment is disclosed. Referring now to FIG. 9, in this example embodiment a parametric disturbance sensor 100 having a stripline sensor core 200 and a fill material 600 surrounding the stripline sensor core 200 is depicted. The parametric disturbance sensor 100 is embedded directly in the road 904. The parametric disturbance sensor 100 in this alternate example embodiment is embedded in a trench, cut space, carved space, moulded space, or any other space in the road 904 so that the parametric disturbance sensor 100 is approximately flush, at least in part, with the road 904.

In this example, the road 906 itself acts, at least in part, as an enclosure for the stripline sensor core 200. In the example depicted in FIG. 9, the fill material 600 directly contacts the road 904 such that the road 904 acts as a replacement for the bottom, sides, and ends of the stripline enclosure. In this example embodiment, the fill material 600 is left exposed at the top so that a load (e.g., from a wheel of a vehicle) is applied directly to the fill material 600 of the parametric disturbance sensor 100. In another example embodiment, the exposed top of the parametric disturbance sensor 100 may be covered. Examples of a covering include, but are not limited to, any one or a combination of a steel plate, a roadway paving material, gravel, aggregate, sand, or any other material suitable for use in a roadway.

In another embodiment, the stripline sensor core 200 is embedded directly in the road 904 without a fill material 600 surrounding the stripline sensor core 200. Then, the parametric disturbance sensor 100 is fixed in the space in the road by a roadway fill material (not illustrated) such as, for example, a roadway paving material, grout, concrete, or asphalt. In another embodiment, the fill material and the roadway fill material may be the same material.

In this example one or more positioning blocks 404 may also be used to position the stripline sensor core 200 in the space in the road 904. Once the stripline sensor core 200 is positioned in the space in the road 904, the fill material 600 is applied so that the fill material 600 fills the space in the road 904 and covers, at least in part, the stripline sensor core 200.

Referring now to FIG. 10A and FIG. 10B, an example of how the parametric disturbance sensor 100 of FIG. 9 might be used in a road 904 is provided. FIG. 10A depicts a representative top down view of a vehicle having a wheel 900 and an axle 902 crossing over a parametric disturbance sensor 100 embedded in a road 904. FIG. 10B depicts a representative front view cross section (along the plane marked C-C in FIG. 10A) of the vehicle of FIG. 10A crossing over a parametric disturbance sensor 100 embedded in a road 904.

The operation of the parametric disturbance sensor 100 as depicted in FIGS. 10A and 10B is substantially similar to the operation previously described in FIGS. 8A and 8B. The difference is that as the wheel 900 rolls over the parametric disturbance sensor 100 the force 906 is applied directly to the fill material 600, the roadway fill material, and/or the covering. The force 906 is then transmitted to the stripline sensor core 200 as previously described.

Figure 11:
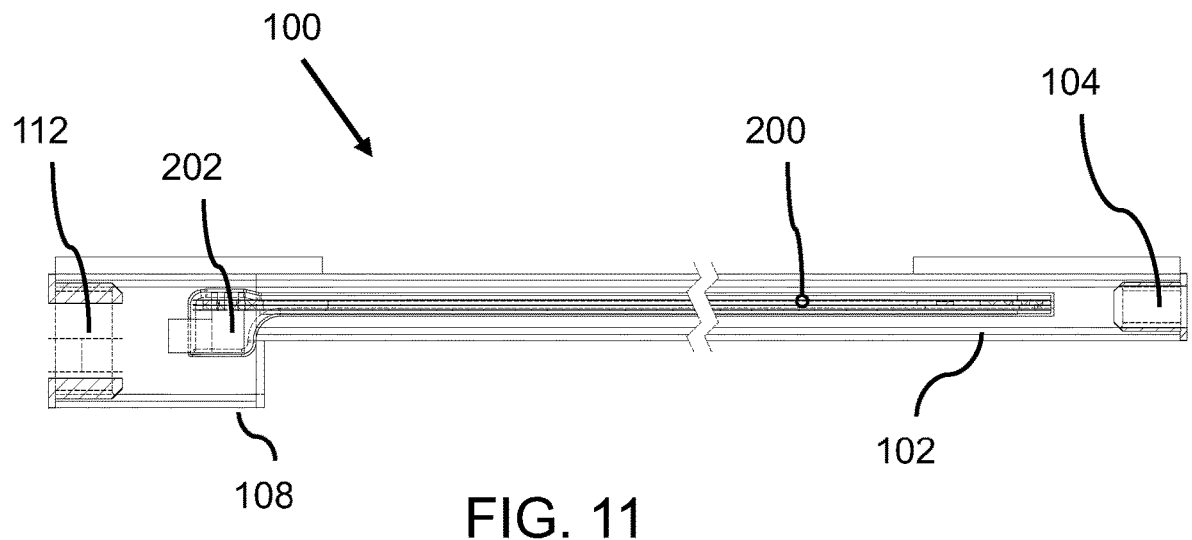
FIG. 11 [PAGE 9/10] depicts a cross-sectional view of another embodiment of the parametric disturbance sensor.

Referring now to FIG. 11 and FIG. 12A an alternate parametric disturbance sensor 100 is provided. In this example the stripline sensor core 200 is attached to an interior wall of the stripline enclosure 102. That is, the stripline sensor core 200 is directly attached to the interior wall of the stripline enclosure 102.

In the example depicted in FIG. 11 and FIG. 12A, the fill material 600 fills the internal chamber of the stripline enclosure 102 so that the fill material 600 surrounds the sides of the stripline sensor core 200 that are not attached to the stripline enclosure 102.

Furthermore, it will be appreciated that in the example depicted in FIG. 11 and FIG. 12A where the stripline sensor core 200 is attached to an inner wall of the stripline enclosure 102 that is closest to a surface of a road or surface, a force exerted on the stripline enclosure 102 will be transmitted directly to the stripline sensor core 200 rather than through the fill material 600.

In other embodiments where the stripline sensor core 200 is attached to an inner wall that is not closest to the surface of a road or surface, the fill material will transmit, at least in part, any forces exerted on the of the stripline enclosure 102 to the stripline sensor core 200.

Referring now to FIG. 12B an alternate example of the parametric disturbance sensor 100 is depicted. In this example the stripline sensor core 200 is attached to the stripline enclosure 102 using an adhesive layer 1000. The adhesive layer 1000 is used to attach the stripline sensor core 200 to an interior wall of the stripline enclosure 102.

In this example the adhesive layer 1000 is attached to a top surface of the stripline sensor core 200 and extends the length of the stripline sensor core 200. Generally, however, the adhesive layer 1000 will be between a surface of the stripline sensor core 200 and an inner wall of the interior chamber of the stripline enclosure 102.

It will be appreciated that the adhesive layer 1000 can be applied to any appropriate surface of the stripline sensor core 200. For instance, in the case where the stripline sensor core 200 does not require sensor core stiffeners 700, the adhesive layer 1000 is attached to a ground plane 800 of the stripline sensor core 200, then the stripline sensor core 200 and adhesive are attached to the interior wall of the stripline enclosure 102. In other embodiments the adhesive layer 1000 is applied to another surface of the stripline sensor core 200 such as the sensor core stiffener 700.

Furthermore the adhesive layer 1000 can be applied to the any part of, or the entirety of, a surface of the stripline sensor core 200. In the embodiment depicted in FIG. 12B the adhesive layer 1000 is at least as wide as the stripline sensor core 200. The adhesive layer 1000 is continuous and also at least as long as the stripline sensor core 200. In other embodiments, however, the adhesive layer can include one or more adhesive strip segments (not shown) applied anywhere along the stripline sensor core 200.

The adhesive strip segments can be sized in any suitable manner. For instance, in some embodiments the stripline sensor core 200 is attached to the stripline enclosure 102 using two or more adhesive strip segments that are half as wide as the stripline sensor core 200 and $\frac{1}{10}^{th}$ the length of the stripline sensor core. Other configurations of adhesive strip segments can be used as necessary.

It will be appreciated that in these embodiments the fill material 600 will fill any voids or spaces defined by the stripline sensor core 200, the adhesive strip segments (not shown), and the stripline enclosure 102.

The adhesive layer 1000 is configured to mechanically transmit, at least in part, forces exerted on the stripline enclosure 102 to the stripline sensor core 200.

In some embodiments the adhesive layer 1000 is an electrical insulator that electrically isolates the stripline sensor core 200 from the stripline enclosure 102.

The adhesive layer can be any material suitable for attaching the stripline sensor core 200 to the interior wall of the stripline enclosure 102. Examples of these materials include, but are not limited to, a two-sided acrylic adhesive, a heat activated adhesive (e.g., 3M THERMOBOND FILM), glue, epoxy, etc.

The following clauses are offered as further description of the examples of the parametric disturbance sensor. Any one or more of the following clauses may be combinable with any another one or more of the following clauses and/or with any subsection or a portion or portions of any other clause and/or combination and permutation of clauses. Any one of the following clauses may stand on its own merit without having to be combined with any other clause or with any portion of any other clause, etc. CLAUSE 1: A Parametric Disturbance Sensor of any one or a combination of the clauses in this paragraph having a stripline enclosure defining an internal chamber; a stripline sensor core positioned within the internal chamber; a fill material filling the internal chamber; and a cable-end connector connected to the stripline sensor core for connecting the stripline sensor core to a processing unit. CLAUSE 2: A Parametric Disturbance Sensor of any one or a combination of the clauses in this paragraph wherein: the fill material mechanically transmits a load, at least in part, on the stripline enclosure to the stripline sensor core once the load is applied to the stripline enclosure. CLAUSE 3: a Parametric Disturbance Sensor of any one or a combination of the clauses in this paragraph wherein the stripline sensor core is configured to change an electrical transmission-line parameter in response to the reception of a load. CLAUSE 4: A Parametric Disturbance Sensor of any one or a combination of the clauses in this paragraph wherein: the stripline sensor core is positioned in the internal chamber so that the stripline sensor core is not in direct contact with an inner wall of the internal chamber. CLAUSE 5: A Parametric Disturbance Sensor of any one or a combination of the clauses in this paragraph wherein: the stripline sensor core is electrically isolated from the stripline enclosure. A Parametric Disturbance Sensor of any one or a combination of the clauses in this paragraph comprising: a positioning block configured to position the stripline sensor core within the internal chamber so that the stripline sensor core does not directly contact the inner wall of the internal chamber. CLAUSE 6: A Parametric Disturbance Sensor of any one or a combination of the clauses in this paragraph wherein: the positioning block is attached to the stripline sensor core. CLAUSE 8: a Parametric Disturbance Sensor of any one or a combination of the clauses in this paragraph comprising: a sensor core stiffener configured adjacent to a first ground plane of the stripline sensor core and a second ground plane of the stripline sensor core, wherein the sensor core stiffener is configured to: stiffen the sensor core, and spread, at least in part, a load on the sensor core once the load is applied to the sensor core. CLAUSE 9: a Parametric Disturbance Sensor of any one or a combination of the clauses in this paragraph comprising a wrap, surrounding the stripline sensor core, configured to prevent the fill material from entering an interior of the stripline sensor core. CLAUSE 10: a Parametric Disturbance Sensor of any one or a combination of the clauses in this paragraph comprising: a base impedance that is tuned, at least in part, by pre-loading the sensor core by adjusting a pressure of the fill material when filling the internal chamber. CLAUSE 11: a Parametric Disturbance Sensor of any one or a combination of the clauses in this paragraph comprising: a base impedance that is tuned, at least in part, by adjusting a distance between a first ground plane and a second ground plane of the sensor core from a center trace. CLAUSE 12: a Parametric Disturbance Sensor of any one or a combination of the clauses in this paragraph wherein: the stripline enclosure is a steel tube. CLAUSE 13: a Parametric Disturbance Sensor of any one or a combination of the clauses in this paragraph wherein: the stripline enclosure is a groove defined in a roadway. CLAUSE 14: a Parametric Disturbance Sensor of any one or a combination of the clauses in this paragraph wherein: the stripline sensor core is attached to an inner wall of the internal chamber so that the load, at least in part, is mechanically transmitted from the stripline enclosure to the stripline sensor core through the inner wall. CLAUSE 15: a Parametric Disturbance Sensor of any one or a combination of the clauses in this paragraph wherein: the stripline sensor core is attached to the inner wall of the internal chamber using an intermediate attachment layer so that the stripline sensor core is not in direct contact with the inner wall. CLAUSE 16: a Parametric Disturbance Sensor of any one or a combination of the clauses in this paragraph wherein: the intermediate attachment layer is an adhesive. CLAUSE 17: a method of manufacturing a parametric disturbance sensor of any one or a combination of the clauses in this paragraph comprising: positioning a stripline sensor core within an internal chamber of a stripline enclosure; sealing a first end of the internal chamber; and filling the internal chamber with a fill material. CLAUSE 18: a method of manufacturing a parametric disturbance sensor of any one or a combination of the clauses in this paragraph comprising: pre-loading the stripline sensor core by filling the internal chamber with the fill material so that the fill material exerts a force on the stripline sensor core. CLAUSE 19: a method of manufacturing a parametric disturbance sensor of any one or a combination of the clauses in this paragraph comprising: attaching the stripline sensor core to an inner wall of the internal chamber using an adhesive. CLAUSE 20: a sensor core of any one or a combination of the clauses in this paragraph comprising: a center trace; a first ground plane separated from the center trace by a first separator; a second ground plane separated from the center trace by a second separator; and a cable-end connector connected to the center trace for connecting the sensor core to a processing unit. CLAUSE 21: a sensor core of any one or a combination of the clauses in this paragraph wherein: the first and second separator are elastically deformable. CLAUSE 22: a sensor core of any one or a combination of the clauses in this paragraph wherein: the first and second separator are an electrically insulating foam. CLAUSE 23: a sensor core of any one or a combination of the clauses in this paragraph wherein: the first and second separator are a closed cell foam with a loss tangent similar to air.

This written description uses examples to disclose the invention, including the best mode, and also to enable any person skilled in the art to make and use the invention. The patentable scope of the invention is defined by the claims, and may include other examples that occur to those skilled in the art. Such other examples are within the scope of the claims if they have structural elements that do not differ from the literal language of the claims, or if they include equivalent structural elements with insubstantial differences from the literal language of the claims.

It may be appreciated that the assemblies and modules described above may be connected with each other as required to perform desired functions and tasks within the scope of persons of skill in the art to make such combinations and permutations without having to describe each and every one in explicit terms. There is no particular assembly or component that may be superior to any of the equivalents available to the person skilled in the art. There is no particular mode of practicing the disclosed subject matter that is superior to others, so long as the functions may be performed. It is believed that all the crucial aspects of the disclosed subject matter have been provided in this document. It is understood that the scope of the present invention is limited to the scope provided by the independent claim(s), and it is also understood that the scope of the present invention is not limited to: (i) the dependent claims, (ii) the detailed description of the non-limiting embodiments, (iii) the summary, (iv) the abstract, and/or (v) the description provided outside of this document (that is, outside of the instant application as filed, as prosecuted, and/or as granted). It is understood, for this document, that the phrase "includes" is equivalent to the word "comprising." The foregoing has outlined the non-limiting embodiments (examples). The description is made for particular non-limiting embodiments (examples). It is understood that the non-limiting embodiments are merely illustrative as examples.

The invention claimed is:

1. A Parametric Disturbance Sensor comprising:
a stripline enclosure defining an internal chamber;
a stripline sensor core positioned within the internal chamber;
a fill material filling the internal chamber between the stripline sensor core and the stripline enclosure; and
a cable-end connector connected to the stripline sensor core for connecting the stripline sensor core to a processing unit,
wherein the fill material is configured to mechanically transmit a load applied to a portion of the stripline enclosure to a corresponding portion of the stripline sensor core.

2. The sensor of claim 1, wherein:
the fill material comprises a resilient material configured to mechanically transmit loads from the stripline enclosure to the stripline sensor core in a vertical direction.

3. The sensor of claim 1, wherein:
the stripline sensor core is configured to change an electrical transmission-line parameter in response to the reception of a load.

4. The sensor of claim 3, wherein:
the stripline sensor core is positioned in the internal chamber so that the stripline sensor core is not in direct contact with an inner wall of the internal chamber.

5. The sensor of claim 4, wherein:
the stripline sensor core is electronically isolated from the stripline enclosure.

6. The sensor of claim 5, comprising:
a positioning block configured to position the stripline sensor core within the internal chamber so that the stripline sensor core does not directly contact the inner wall of the internal chamber.

7. The sensor of claim 6, wherein:
the positioning block is attached to the stripline sensor core.

8. The sensor of claim 3, comprising:
a sensor core stiffener configured adjacent to a first ground plate of the stripline sensor core and a second ground plane of the stripline sensor core, wherein the sensor core stiffener is configured to:
stiffen the stripline sensor core, and
spread, at least in part, a load on the stripline sensor core once the load is applied to the stripline sensor core.

9. The sensor of claim 3, comprising:
a wrap, surrounding the stripline sensor core, configured to prevent the fill material from entering an interior of the stripline sensor core.

10. The sensor of claim 3, comprising:
a base impedance that is tuned, at least in part, by pre-loading the stripline sensor core by adjusting a pressure of the fill material when filling the internal chamber.

11. The sensor of claim 3, comprising:
a base impedance that is tuned, at least in part, by adjusting a distance between a first ground plane and a second ground plane of the stripline sensor core from a center trace.

12. The sensor of claim 3, wherein:
the stripline enclosure is a steel tube.

13. The sensor of claim 3, wherein:
the stripline enclosure is a groove defined in a roadway.

14. The sensor of claim 3, wherein:
the stripline sensor core is attached to an inner wall of the internal chamber so that the load, at least in part, is mechanically transmitted from the stripline enclosure to the stripline sensor core through the inner wall.

15. The sensor of claim 14, wherein:
the stripline sensor core is attached to the inner wall of the internal chamber using an intermediate attachment layer so that the stripline sensor core is not in direct contact with the inner wall.

16. The sensor of claim 15, wherein:
the intermediate attachment layer is an adhesive.

17. A method of manufacturing a parametric disturbance sensor comprising:
positioning a stripline sensor core within an internal chamber of a stripline enclosure;
sealing a first end of the internal chamber;
filling the internal chamber with a fill material; and
pre-loading the stripline sensor core by filling the internal chamber with the fill material between the stripline sensor core and the stripline enclosure, wherein the fill material is configured to mechanically transmit a load applied to a portion of the stripline enclosure to a corresponding portion of the stripline sensor core.

18. The method of claim 17, wherein the fill material comprises a resilient material configured to mechanically transmit loads from the stripline enclosure to the stripline sensor core in a vertical direction.

19. The method of claim 17, further comprising:
attaching the stripline sensor core to an inner wall of the internal chamber using an adhesive.

20. A sensor core, comprising:
a center trace;
a first ground plane separated from the center trace by a first separator;
a second ground plane separated from the center trace by a second separator; and
a cable-end connector connected to the center trace for connecting the sensor core to an electrical time domain reflectometry (ETDR) processor.

21. The sensor core of claim 20, wherein:
the first and second separator are elastically deformable.

22. The sensor core of claim 21, wherein:
the first and second separator are an electrically insulating foam.

23. The sensor core of claim 22, wherein:
the first and second separator are a closed cell foam with a loss tangent similar to air.

24. The sensor of claim 1, wherein the processing unit comprises an electrical time domain reflectometry (ETDR) processor configured to determine a magnitude and a location of the load applied to a portion of the stripline enclosure based on discontinuity of a wave reflected in the stripline sensor core.

* * * * *